(12) United States Patent
Choi et al.

(10) Patent No.: US 8,462,878 B2
(45) Date of Patent: Jun. 11, 2013

(54) METHOD FOR TRANSMITTING SIGNALS FOR ACHIEVING DIVERSITY GAIN

(75) Inventors: Jin Soo Choi, Anyang-Si (KR); Min Seok Oh, Anyang-Si (KR); Hyung Ho Park, Anyang-Si (KR); Sung Ho Moon, Anyang-Si (KR); Kyu Jin Park, Anyang-Si (KR); Jae Hoon Chung, Anyang-Si (KR); Doo Hyun Sung, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 12/597,331

(22) PCT Filed: Apr. 23, 2008

(86) PCT No.: PCT/KR2008/002297
§ 371 (c)(1),
(2), (4) Date: Feb. 24, 2010

(87) PCT Pub. No.: WO2008/130188
PCT Pub. Date: Oct. 30, 2008

(65) Prior Publication Data
US 2010/0177843 A1    Jul. 15, 2010

(30) Foreign Application Priority Data

Apr. 23, 2007 (KR) .................. 10-2007-0039432

(51) Int. Cl.
*H04L 27/00* (2006.01)

(52) U.S. Cl.
USPC ........... 375/295; 375/259; 375/260; 375/267; 375/299

(58) Field of Classification Search
USPC ................ 375/295, 259, 260, 267, 299
See application file for complete search history.

(56) References Cited

U.S. PATENT DOCUMENTS

| | | | |
|---|---|---|---|
| 6,788,661 B1 * | 9/2004 | Ylitalo et al. | 370/334 |
| 6,947,769 B1 * | 9/2005 | Itomitsu et al. | 455/561 |
| 2004/0057530 A1 * | 3/2004 | Tarokh et al. | 375/267 |
| 2005/0018713 A1 * | 1/2005 | Ling et al. | 370/536 |
| 2005/0031050 A1 * | 2/2005 | Kim et al. | 375/267 |
| 2005/0193307 A1 | 9/2005 | Wengerter et al. | |
| 2006/0077887 A1 | 4/2006 | Roh et al. | |
| 2007/0153928 A1 * | 7/2007 | Liu et al. | 375/260 |
| 2007/0263735 A1 * | 11/2007 | Tong et al. | 375/260 |
| 2008/0247479 A1 * | 10/2008 | Ma et al. | 375/260 |
| 2009/0010227 A1 * | 1/2009 | Ihm et al. | 370/334 |

FOREIGN PATENT DOCUMENTS

| | | |
|---|---|---|
| CN | 1620776 A | 5/2005 |
| WO | WO-2004/036818 A1 | 4/2004 |
| WO | WO-2004/057776 A1 | 7/2004 |
| WO | WO 2005/096531 A1 | 10/2005 |

OTHER PUBLICATIONS

PCT/IB2006/002714 (US 2008/0247479 A1).*
PCT/KR2005/004575, Retransmission method for multiple antenna system, published in English on Jun. 7, 2006, filing date Dec. 27, 2005.*

* cited by examiner

*Primary Examiner* — Siu Lee
(74) *Attorney, Agent, or Firm* — Birch, Stewart, Kolasch & Birch, LLP

(57) ABSTRACT

A method for transmitting signals for achieving diversity gain is provided. In a communication system having multiple independent transmission paths, a signal is transmitted by mapping it to different independent transmission paths at initial transmission and at retransmission, thereby obtaining diversity gain. Especially, real and ideal components of a transmission signal are mapped to different transmission paths, thereby obtaining additional gain.

6 Claims, 16 Drawing Sheets

FIG. 3

| 4transmission | 3transmission | 2transmission | 1transmission | |
|---|---|---|---|---|
| $S_{1,I} + jS_{1,Q}$ | $S_{1,I} + jS_{1,Q}$ | $S_{1,I} + jS_{1,Q}$ | $S_{1,I} + jS_{1,Q}$ | 1 |
| $S_{2,I} + jS_{2,Q}$ | $S_{2,I} + jS_{2,Q}$ | $S_{2,I} + jS_{2,Q}$ | $S_{2,I} + jS_{2,Q}$ | 2 |
| $S_{3,I} + jS_{3,Q}$ | $S_{3,I} + jS_{3,Q}$ | $S_{3,I} + jS_{3,Q}$ | $S_{3,I} + jS_{3,Q}$ | 3 |
| $S_{4,I} + jS_{4,Q}$ | $S_{4,I} + jS_{4,Q}$ | $S_{4,I} + jS_{4,Q}$ | $S_{4,I} + jS_{4,Q}$ | 4 |

METHOD FOR TRANSMITTING SIGNALS FOR ACHIEVING DIVERSITY GAIN

TECHNICAL FIELD

The present invention relates to a method for transmitting signals for achieving diversity gain.

BACKGROUND ART

We first describe the structure of a general multiple antenna OFDM communication system.

FIG. 1 illustrates the structures of transmitting and receiving ends using a single codeword (SCW) in a general multiple antenna OFDM communication system and FIG. 2 illustrates the structures of transmitting and receiving ends using multiple codewords (MCW) in a general multiple antenna OFDM communication system.

As shown in FIGS. 1 and 2, a transmitting end 100 in a general multiple antenna OFDM communication system includes an encoder 101, an HARQ function module 102, a channel interleaver 103, a serial/parallel (S/P) converter 104, a mapper 105, a resource allocation module 106, an IFFT module 107, etc.

Specifically, the encoder 101 performs coding to insert extra bits to data bits in order to reduce channel or noise effects and the HARQ function module 102 performs retransmission and rate matching. The channel interleaver 103 shuffles, on a bit basis, bits with CRCs or the like inserted into the bits in order to spread an intensive burst error that may occur in a channel. The S/P converter 104 converts a serial signal into a parallel signal. The mapper 105 converts the parallel bit information into symbols. The resource allocation module 106 maps the symbols to appropriate subcarrier positions and the IFFT module 107 modulates them into OFDM symbols and transmits the OFDM symbols over a channel 300.

Since the transmitting end 100 of FIG. 1 uses a single codeword, the transmitting end 100 of FIG. 1 includes one encoder 101, one HARQ function module 102, and one channel interleaver 103 as shown in FIG. 1. On the other hand, since the transmitting end 100 of FIG. 2 uses two codewords, the transmitting end 100 of FIG. 2 includes two encoders 101, two HARQ function modules 102, and two channel interleavers 103 as shown in FIG. 2.

As shown in FIGS. 1 and 2, the receiving end 200 may include an FFT module 201, a resource deallocation module 202, a demapper 203, a parallel/serial (P/S) converter 204, a channel deinterleaver 205, an HARQ defunction module 206, and a decoder 207. The receiving end 200 receives a signal and performs the reverse of the procedure of the transmitting end 100.

Specifically, in the receiving end 200, data, which has passed through the channel 300, is extracted from the physical channel through the FFT module 201 and the resource deallocation module 202. Then, the symbol information is converted into bit information through the demapper 203. The bit information then passes through the P/S converter 204 and the channel deinterleaver 205, and the coding rate is converted back to a coding rate for decoding at the HARQ defunction module 206 and is then input to the decoder 207. Finally, the decoder 207 estimates data bits.

Thereafter, through an error detection code such as a CRC bit, it is determined whether or not an error occurred in the transmission packet. The receiving end 200 returns a NACK signal to the transmitting end 100 if it is determined that an error occurred and returns an ACK signal to the transmitting end 100 if it is determined that no error occurred. The transmitting end 100 does not retransmit data when the ACK signal is received and retransmits data in the order specified by a scheduler when the NACK signal is received.

The following is a more detailed description of the function of the resource allocation module 106 that is involved in data retransmission in the HARQ function in the structures of the transmitting and receiving ends 100 and 200 described above with reference to FIGS. 1 and 2 in association with the data retransmission method.

FIG. 3 illustrates a conventional method in which a resource allocation module maps data to multiple antennas to retransmit the data through the multiple antennas.

As shown in FIG. 3, in the conventional retransmission method, a packet is retransmitted through the same antenna as that through which the packet was previously transmitted. Here, a subcarrier location to which the packet data is allocated can be changed or unchanged.

If data is transmitted at each retransmission through the same antenna as that through which the data was previously transmitted in the above manner, the data is transmitted over a channel similar to that over which the data was previously transmitted and taking full use of channel diversity gain is difficult. That is, if data is retransmitted over a good channel at second transmission after being transmitted over a bad channel at first transmission, the retransmission partially compensates for a reduction in the performance due to the bad channel. However, if data is retransmitted through the same antenna as during first transmission, it is difficult to achieve channel diversity gain.

DISCLOSURE

[Technical Problem]

An object of the present invention devised to solve the problem lies in providing a signal transmission method which can obtain a sufficient channel diversity gain when data is retransmitted in a multiple antenna and/or general OFDM communication system.

[Technical Solution]

The object of the present invention can be achieved by providing a method for transmitting signals in a communication system having multiple independent transmission paths, the method including a first transmission process including transmitting multiple transmission signals by mapping the multiple transmission signals to the multiple independent transmission paths according to a specific mapping rule; and a second transmission process including retransmitting the multiple transmission signals by mapping each of the multiple transmission signals to a different independent transmission path from an independent transmission path that was mapped to the transmission signal in the first transmission process.

The transmission signals may be complex signals. In this case, real and ideal components of the complex signals may be transmitted by mapping the real and ideal components to different independent transmission paths in the first and second transmission processes.

In addition, the method may further include at least one additional transmission process including retransmitting the multiple transmission signals by mapping the multiple transmission signals to the multiple independent transmission paths. Here, when a total number of the transmission processes including the at least one additional transmission process is less than or equal to a number of the multiple independent transmission paths, it is preferable that the multiple transmission signals be transmitted by mapping each of the multiple transmission signals to a different independent transmission path in each of the transmission processes.

When the communication system is a multiple antenna Orthogonal Frequency Division Multiplexing (OFDM) communication system, the multiple independent transmission paths may include at least one of multiple transmission paths formed by multiple antennas and multiple subcarrier regions. Here, the multiple subcarrier regions may be subcarrier regions having at least a minimum coherent bandwidth between the subcarrier regions.

On the other hand, when the communication system is a multiple antenna Single Carrier-Frequency Division Multiplexing (SC-FDM) communication system, the multiple independent transmission paths may include at least one of transmission paths formed by multiple antennas.

In another aspect of the invention, provided herein is a method for transmitting multiple complex signals in a communication system having multiple independent transmission paths, the method including mapping real and ideal components of the multiple complex signals to different independent paths; and transmitting the mapped multiple complex signals.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

As described above, the invention suggests a signal transmission method which can obtain a sufficient channel diversity gain when data is retransmitted in a multiple antenna and/or general OFDM communication system. That is, the invention suggests a signal transmission method in which a sufficient diversity gain is obtained by transmitting a signal through a different independent transmission path each time the signal is transmitted in a communication system having multiple independent transmission paths such as an OFDM system including multiple subcarrier regions having at least a minimum coherent bandwidth between the subcarrier regions or a multiple antenna system including multiple antennas. In a preferred embodiment of the invention, when a complex signal is transmitted, real and ideal components of the complex signal are transmitted through different independent paths, thereby achieving not only diversity gain in the domain of independent transmission paths but also diversity gain in the real and ideal domains.

[Advantageous Effects]

According to the invention, independent transmission paths to which transmission signals are mapped are set to be different each time they are transmitted, thereby obtaining diversity gain. In addition, when transmission signals are complex signals, real and ideal components of the complex signals are separated and mapped to different transmission paths, thereby further improving the system performance.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 illustrates a conventional method in which a resource allocation module maps data to multiple antennas to retransmit the data through the multiple antennas.

BEST MODE

Figure 4:
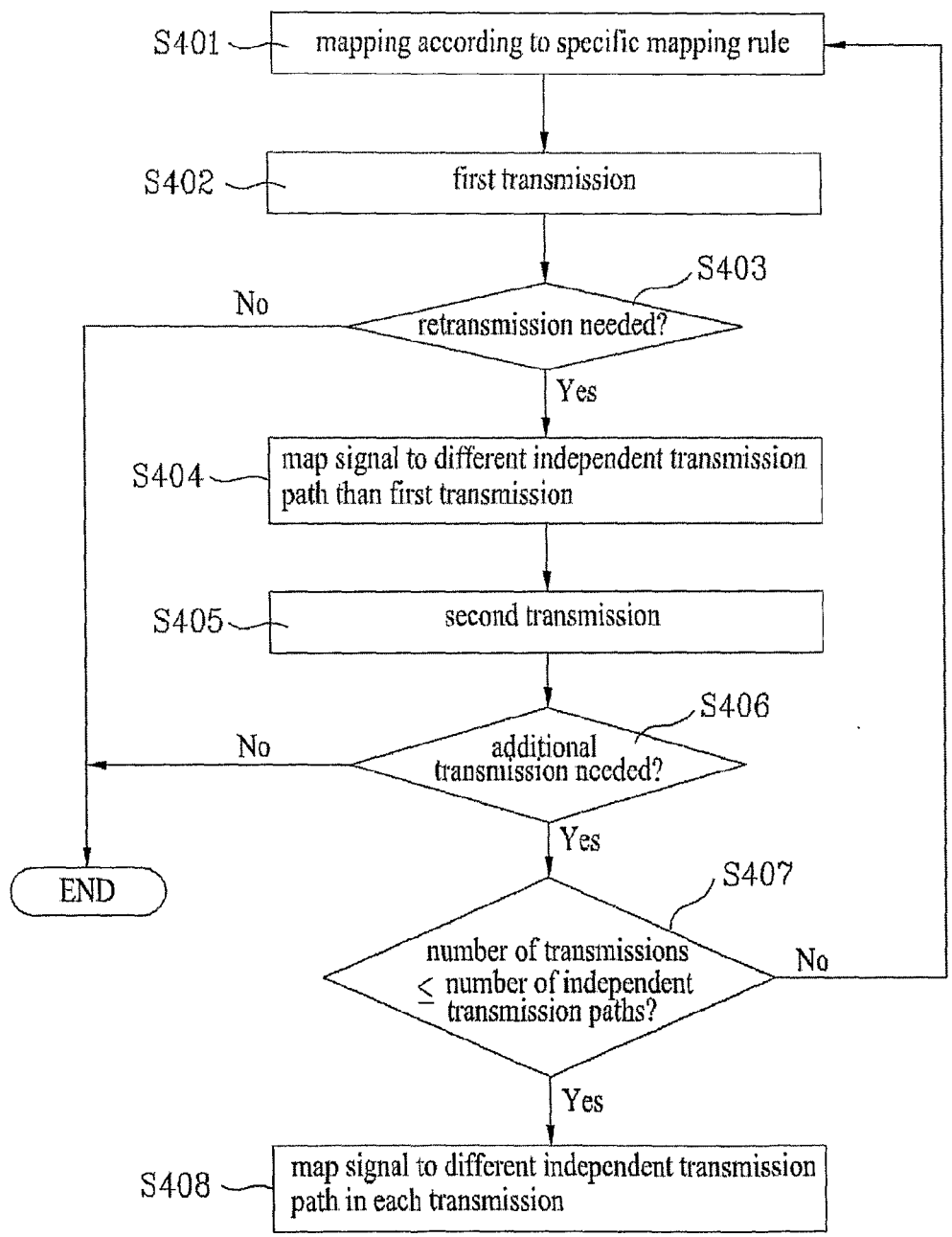
FIG. 4 is a flow chart illustrating a method for transmitting signals according to an embodiment of the invention.

FIG. 4 is a flow chart illustrating a signal transmission method according to an embodiment of the invention.

According to the embodiment of the invention as shown in FIG. 4, first, transmission signals are mapped to multiple independent transmission paths according to a specific mapping rule at step S401. The multiple independent transmission paths may be multiple antennas included in a multiple antenna system or may be independent subcarrier regions in a multiple subcarrier system. The specific mapping rule may be that multiple transmission signals are mapped respectively to multiple independent transmission paths. Thereafter, at step S402, the transmission signals mapped to the multiple independent transmission paths at step S401 are transmitted, which will be referred to as "first transmission."

At step S403, it is determined whether or not retransmission is necessary after the first transmission is performed at step S402. It is determined that retransmission is necessary in any case where the transmitting side needs to retransmit the transmission signals, for example where no ACK signal has been received from the receiving side.

The procedure of FIG. 4 is terminated when it is determined at step S403 that retransmission is unnecessary. The procedure proceeds to step S404 when it is determined at step S403 that retransmission is necessary. At step S404, each of the transmission signals is mapped to a different multiple independent path from that to which the transmission signal was mapped at the first transmission. Mapping each transmission signal to different multiple independent paths at the first transmission and the retransmission can obtain diversity gain. Then, at step S405, the mapped transmission signals are transmitted, which will be referred to as "second transmission."

At step S406, whether or not another transmission is necessary is determined. It is determined that another transmission is necessary, for example when no ACK signal has been received from the receiving side despite the first transmission or when it is necessary to perform a plurality of transmissions of the transmission signals including the first and second transmissions. The procedure of FIG. 4 is terminated when it is determined at step S406 that another transmission is unnecessary. The procedure proceeds to step S407 when it is determined at step S406 that another transmission is necessary. It is determined at step S407 whether or not the total number of transmissions including the first and second transmissions is less than or equal to the number of independent transmission paths used for transmission. If it is determined at step S407 that the total number of transmissions is less than or equal to the number of independent transmission paths used for transmission such as the total number of antennas or the total number of subcarrier regions used for transmission, the procedure proceeds to step S408 to control mapping and transmission of the transmission signals such that each of the transmission signals is mapped to a different independent transmission path each time the transmission signal is transmitted. For example, in the case of a system having four independent transmission paths, mapping and transmission of transmission signals is controlled such that the same transmission signal is not mapped to the same independent transmission path until the transmission signal is transmitted a total of four times. If it is determined at step S407 that the total number of transmissions is greater than the number of independent transmission paths, the transmission signals may be transmitted by remapping them to multiple independent transmission paths according to a specific mapping rule. For this, the procedure may return to step S401 to repeat the subsequent processes as shown in FIG. 4.

Reference will now be made to specific examples where the method according to the embodiment of the invention is applied to a multiple antenna system using multiple antennas.

Figure 5:
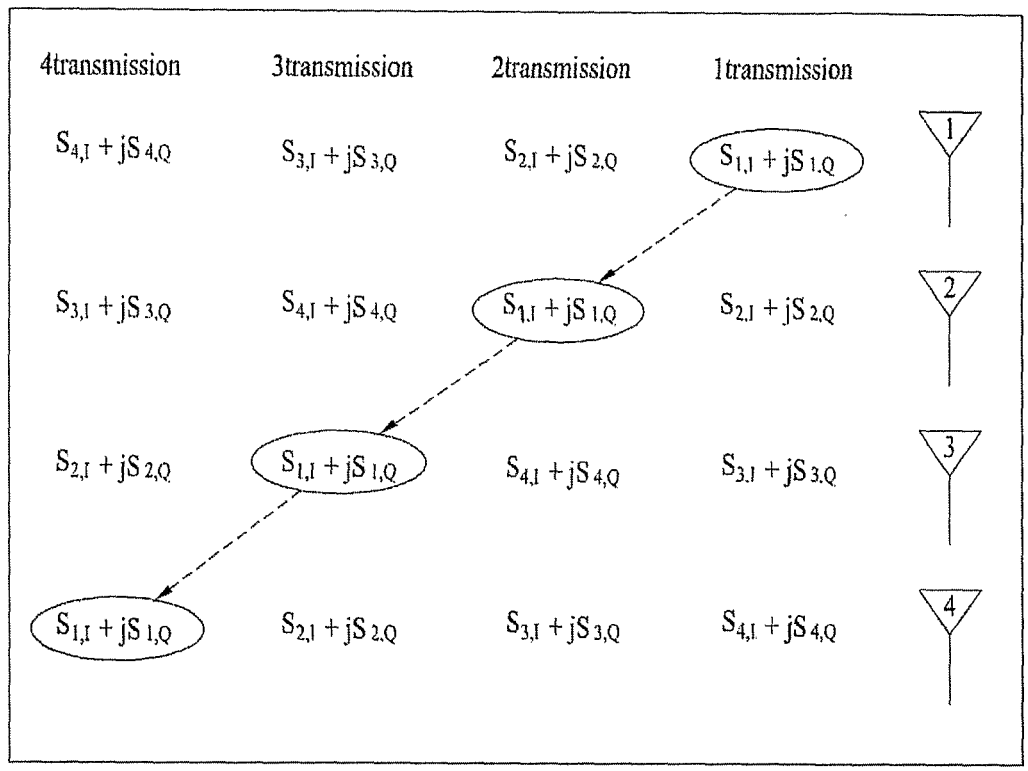
FIG. 5 illustrates a method for transmitting transmission signals by mapping them to multiple antennas according to an embodiment of the invention.

FIG. 5 illustrates a method for transmitting transmission signals by mapping them to multiple antennas according to an embodiment of the invention.

This embodiment, which is applied to a multiple antenna system, relates to how antenna indices to be used when allocating data items mapped on a symbol basis to physical channels are determined and how the data items are allocated to the physical channels each time they are transmitted. That is, data items mapped to symbols at a mapper are transmitted through antennas after how the data items are to be transmitted through the antennas is determined according to an allocation rule as shown in FIG. 5.

Specifically, FIG. 5 shows a structure in which complex signals are mapped to multiple antennas and transmitted through the mapped multiple antennas in a multiple antenna communication system having four transmit antennas. When each complex signal is transmitted four times, the complex signal is mapped to a different antenna in each transmission. For example, as shown in FIG. 5, a signal $S_{1,I}+jS_{1,Q}$ is mapped to a different antenna each time it is transmitted such that it is mapped to a first antenna at first transmission, mapped to a second antenna at second transmission, mapped to a third antenna at third transmission, and mapped to a fourth antenna at fourth transmission. According to this embodiment, it is possible to obtain diversity gain in an antenna domain for each symbol.

When four transmit antennas are provided as shown in FIG. 5, the components of each symbol uniformly undergo the channels of all four antennas when the symbol is transmitted at least four times, thereby maximizing the diversity effects.

Figure 6:
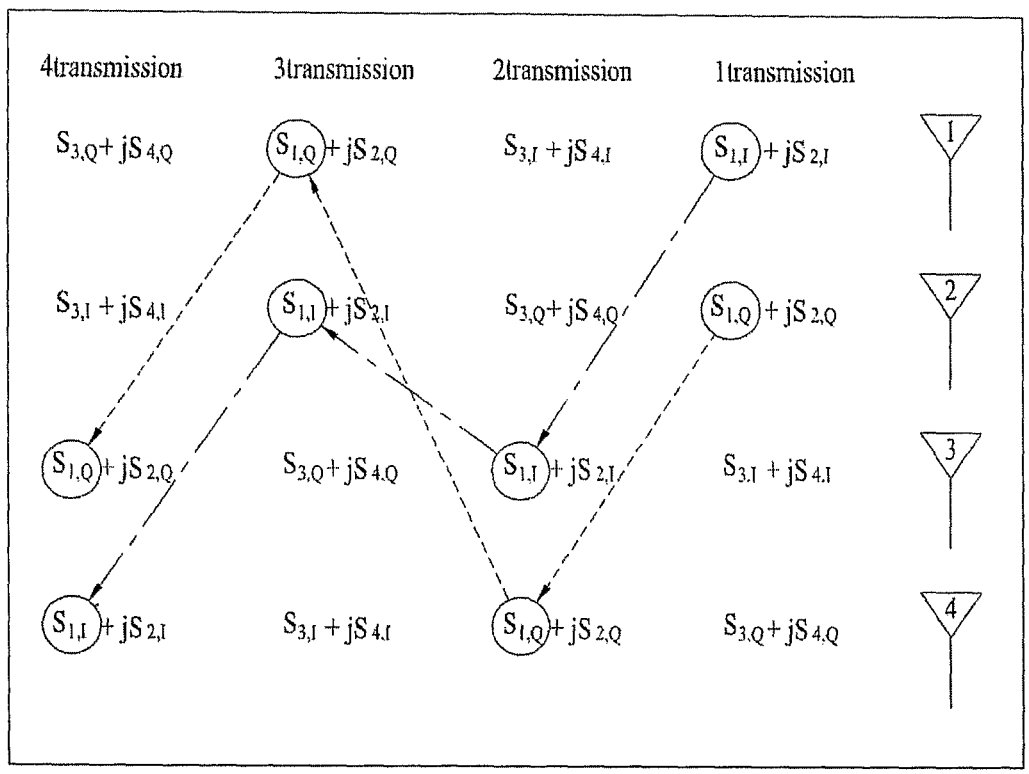
FIG. 6 illustrates a method for transmitting a complex transmission signal by setting real and ideal components of the signal to be mapped to different antennas according to a preferred embodiment of the invention.

FIG. 6 illustrates a method for transmitting a complex transmission signal by setting real and ideal components of the signal to be mapped to different antennas according to a preferred embodiment of the invention.

That is, the embodiment shown in FIG. 6 suggests that antenna indices mapped to transmission signals are changed each time they are retransmitted in the same manner as in the embodiment shown in FIG. 5 while real and ideal components of each of the transmission signals are separated each time the transmission signals are retransmitted. Accordingly, while channel diversity is obtained in the antenna domain for each symbol in the above embodiment of FIG. 5, channel diversity is obtained not only in the antenna domain but also in both the real and ideal domains of each symbol, thereby further increasing performance.

Specifically, according to this embodiment, real components ($S_{1,I}$, $S_{2,I}$) of different symbols may be mapped to a first antenna at first transmission so that a signal $S_{1,I}+jS_{2,I}$ is mapped to the first antenna at first transmission as shown in FIG. 6. That is, real and ideal components of the same transmission signal are transmitted by mapping the real and ideal components to different antennas. For example, $S_{1,I}$ is mapped to the first antenna and $S_{1,Q}$ is mapped to the second antenna. In addition, $S_{1,I}$ transmitted through the first antenna at the first transmission is transmitted through a third antenna at second transmission, is transmitted through a second antenna at third transmission, and is transmitted through a fourth antenna at fourth transmission. In this manner, each transmission signal is mapped to a different antenna each time it is transmitted, thereby obtaining diversity gain in the antenna domain.

When four transmit antennas are provided as shown in FIG. 6, the components of each symbol uniformly undergo the channels of all four antennas when the symbol is transmitted at least four times, thereby maximizing the diversity effects.

Figure 7:
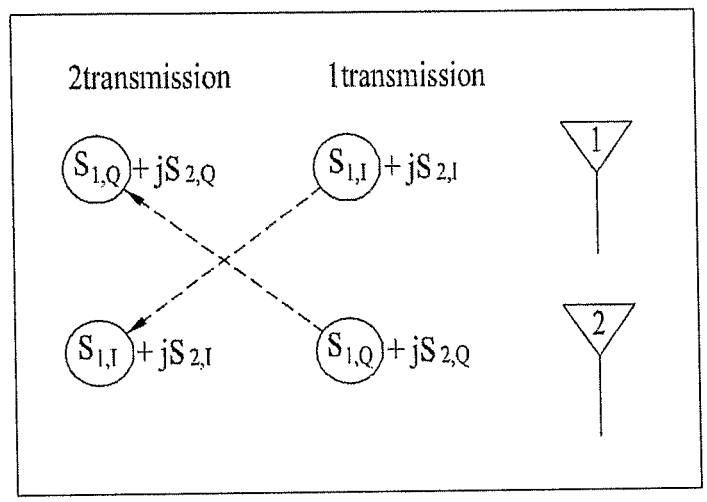
FIG. 7 illustrates a method for transmitting a complex signal in a multiple antenna system including two antennas according to an embodiment of the invention.

FIG. 7 illustrates a method for transmitting a complex signal in a multiple antenna system including two antennas according to an embodiment of the invention.

When the embodiment described above with reference to FIG. 6 is applied to a system including two transmit antennas, each transmission signal is transmitted at least twice as shown in FIG. 7 so that each transmission signal uniformly undergoes the channels of all antennas, thereby maximizing the channel diversity gain.

Although not illustrated in the specific examples of FIGS. 6 and 7, the components of each transmission signal may be alternately mapped to real and ideal axes of each transmit antenna when the transmission signal is retransmitted according to a preferred embodiment of the invention. For example, a component of each transmission signal mapped to the real axis at first transmission may be mapped to the ideal axis when the transmission signal is retransmitted.

Figure 8:
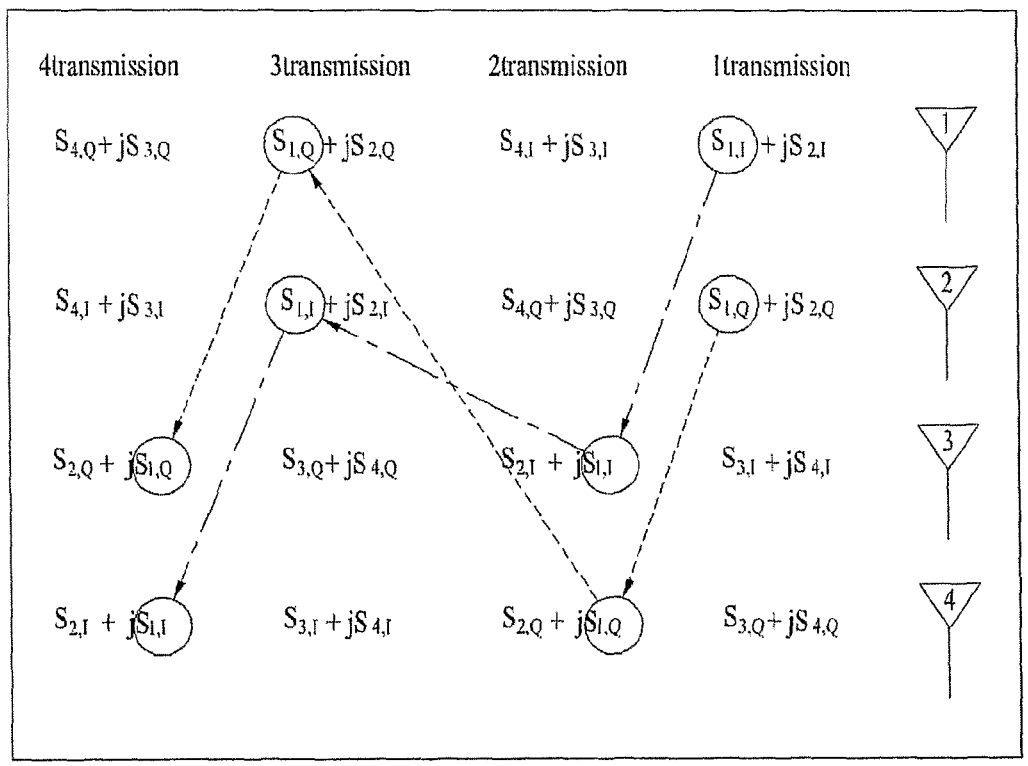
FIGS. 8 and 9 illustrate a method for transmitting a complex signal in a multiple antenna system including four and two antennas according to a preferred embodiment of the invention, respectively.
Figure 9:
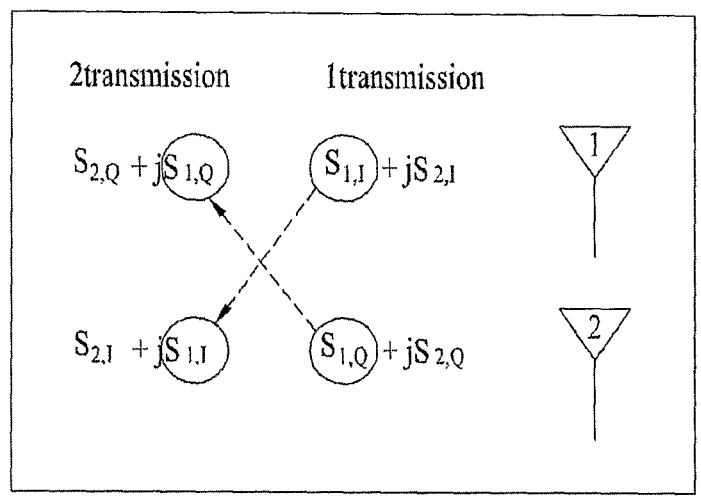

FIGS. 8 and 9 illustrate a method for transmitting a complex signal in a multiple antenna system including four and two antennas according to a preferred embodiment of the invention, respectively.

In the multiple antenna system including four antennas, for example, $S_{1,I}$ mapped to the real axis of the first antenna at the first transmission in the example of FIG. 6 may be mapped to the ideal axis of the third antenna rather than the real axis at the second transmission, and $S_{2,I}$ mapped to the ideal axis of the first antenna at the first transmission may be mapped to the real axis of the third antenna at the second transmission as shown in FIG. 8. Likewise, in the multiple antenna system including two antennas, for example, $S_{1,I}$ mapped to the real axis of the first antenna at the first transmission in the example of FIG. 7 may be mapped to the ideal axis of the second antenna rather than the real axis at the second transmission as shown in FIG. 9.

Figure 10:
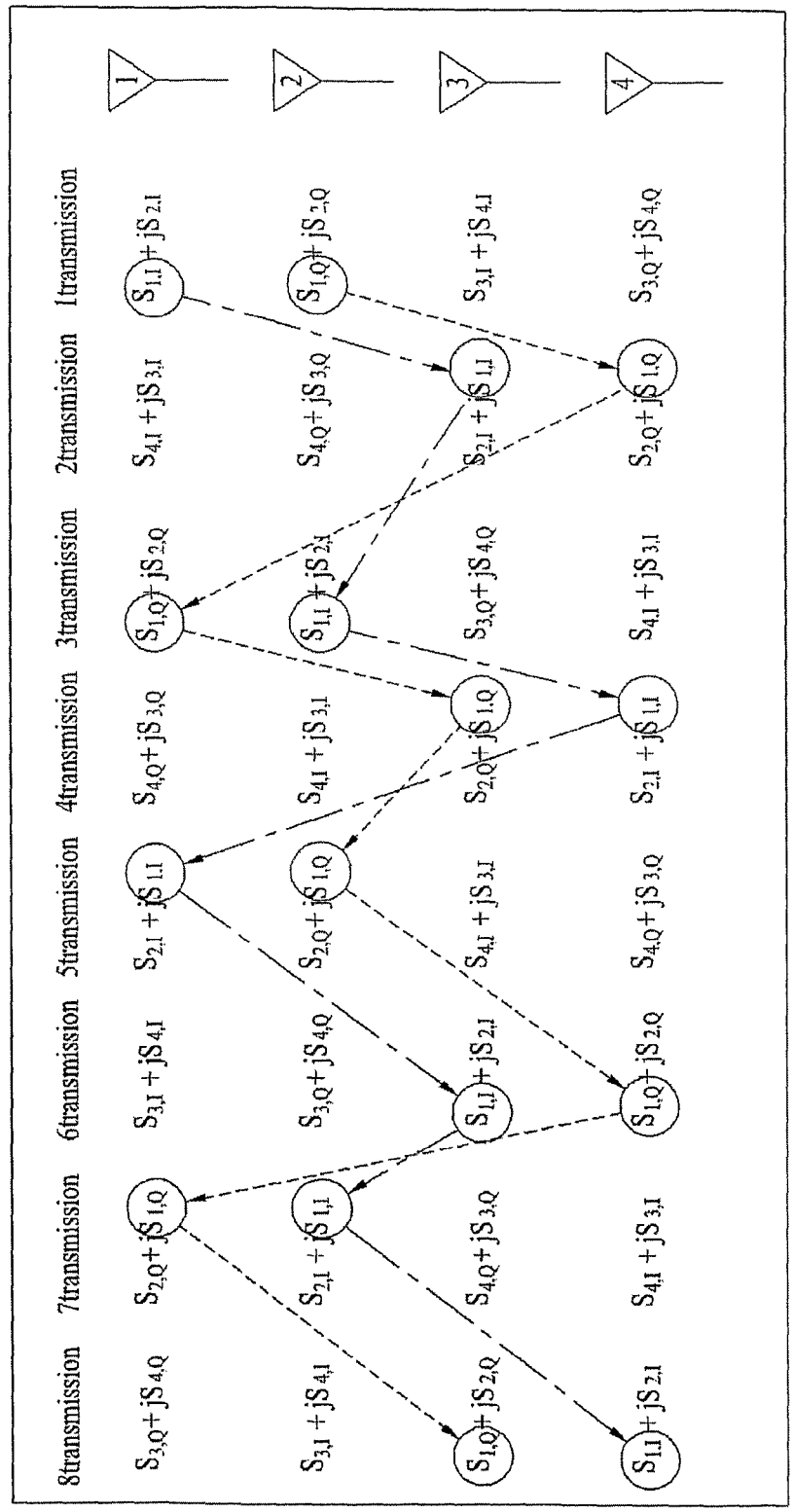
FIGS. 10 and 11 illustrate example methods in which transmission signals are mapped to different locations until they are transmitted a total of eight and four times in a system including four and two antennas according to a preferred embodiment of the invention, respectively.
Figure 11:
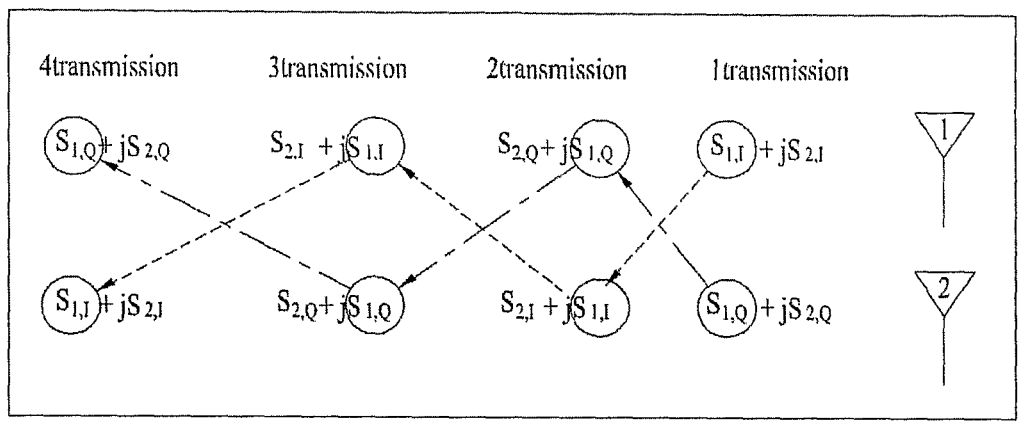

According to the preferred embodiment, as shown in FIGS. 8 and 9, the antenna mapped to each transmission signal may be changed each time the transmission signal is retransmitted while the real and ideal components of the transmission signal are alternately mapped to the real and ideal axes of the antenna each time the transmission signal is retransmitted. This can obtain additional diversity gain. In the case where the components of each transmission signal are mapped to a different antenna each time the transmission signal is retransmitted while the components of the transmission signal are alternately mapped to the real and ideal axes of the antenna each time the transmission signal is retransmitted as described above, it is possible to set each component of a transmission signal to undergo a different channel in each transmission until it is transmitted a total of 8 times in the system using four transmit antennas. An example of this mapping method is illustrated in FIG. 10. Likewise, it is possible to set each component of a transmission signal to undergo a different channel in each transmission until it is transmitted a total of 4 times in the system using two transmit antennas. An example of this mapping method is illustrated in FIG. 11.

The following is a summary of the preferred embodiment of the invention described above.

According to this embodiment, the real and ideal components of a symbol are transmitted through different antennas at first transmission. This embodiment includes any specific mapping method where the real and ideal components of a complex signal are separately carried through different antennas. For, example, while an $S_{1,I}$ component may be carried through the real axis of the first antenna at the first transmission as shown in FIGS. 6 and 7, it may also be carried through the ideal axis of the first antenna or through a different antenna.

According to this embodiment, each component is transmitted through a different antenna from the antenna through which it was carried at the first transmission. This embodiment may also include a method in which the components are carried through different antennas from those in the methods shown in FIGS. 6 to 11. That is, this embodiment includes any specific transmission method in which the real and ideal components of transmission signals are separately carried through different antennas each time they are transmitted. For example, when each component (real or ideal component) has been transmitted through a specific antenna at the current transmission, the component is set to be transmitted through a different antenna from the specific antenna at the next transmission. When the total number of transmissions is less than the total number of transmit antennas, it is preferable that each component of a transmission signal be mapped to a different antenna each time it is retransmitted so that it is not retransmitted through the same antenna. When each component of a transmission signal is retransmitted after the number of transmissions exceeds the number of transmit antennas, each component of the transmission signal may be mapped to the same transmit antenna index as in a previous transmission. However, in the case where each component of a transmission signal is mapped to a different antenna each time it is retransmitted while each component of the transmission signal is alternately mapped to the real and ideal axes of the antenna each time it is retransmitted according to the preferred embodiment described above with reference to FIGS. 8 and 9, each component of the transmission signal can be set to be mapped to a different location from that mapped at the previous transmission until the total number of transmissions reaches twice the number of antennas as shown in FIGS. 10 and 11.

The embodiments of the invention described above can be applied not only to an Orthogonal Frequency Division Multiplexing (OFDM) structure but also to a single carrier structure such as a Single Carrier-Frequency Division Multiplexing (SC-FDM) structure in the same manner. When the OFDM structure is used, transmission signals can be allocated in a distributed fashion not only in the antenna domain but also in the subcarrier domain and can also be allocated in a distributed fashion only in the antenna domain. In a single carrier structure such as SC-FDM, the rules described above are applied when retransmission is performed using only the antenna domain.

According to these embodiments of the invention, it possible to obtain channel diversity since each transmission signal undergoes a different channel each time it is transmitted. Particularly, the real and ideal components of a complex transmission signal are mapped to different antennas when they are transmitted, thereby obtaining not only diversity gain in the antenna domain but also diversity gain in the real and ideal domains.

Diversity gains obtained according to the embodiments of the invention will now be described with reference to detailed simulation results where the embodiments are applied.

The following are various parameters used in the simulation.

TABLE 1

| Link Performance of Downlink Simulation Parameters | |
|---|---|
| BW (total PRB) | 10 MHz |
| PRB size | 12 subcarriers |
| TTI length | 1 ms (0.5 ms per slot) |
| Number of subcarriers (subcarrier spacing) | 600 (15 kHz) |

TABLE 1-continued

Link Performance of Downlink Simulation Parameters

| | |
|---|---|
| reference signal mapping | first and fifth OFDM symbols (containing no data) per subframe |
| channel estimation | complete |
| HARQ | HARQ Chase combining (current retransmission = 2, 4) |
| transmission mode | local resource allocation |
| MCS set | QPSK 1/2, 16QAM 1/2 |
| channel coding | turbo code (K = 6) Max-Log-MAP decoding (repeated 8 times) |
| antenna/receiver | 2 × 2 & 4 × 4/MMSE equalizer |
| channel model | 6-ray typical urban 3 km/h |
| information size | about 1000 bits |

In the following description, comparisons of Frame Error Rate (FER) to SNR performance for each Modulation and Coding Scheme (MCS) level between the case where a Spread Data Allocation (SDA) method according to the embodiments of the invention is applied and the case where a general retransmission method is applied will be described with reference to simulation results.

Figure 12:
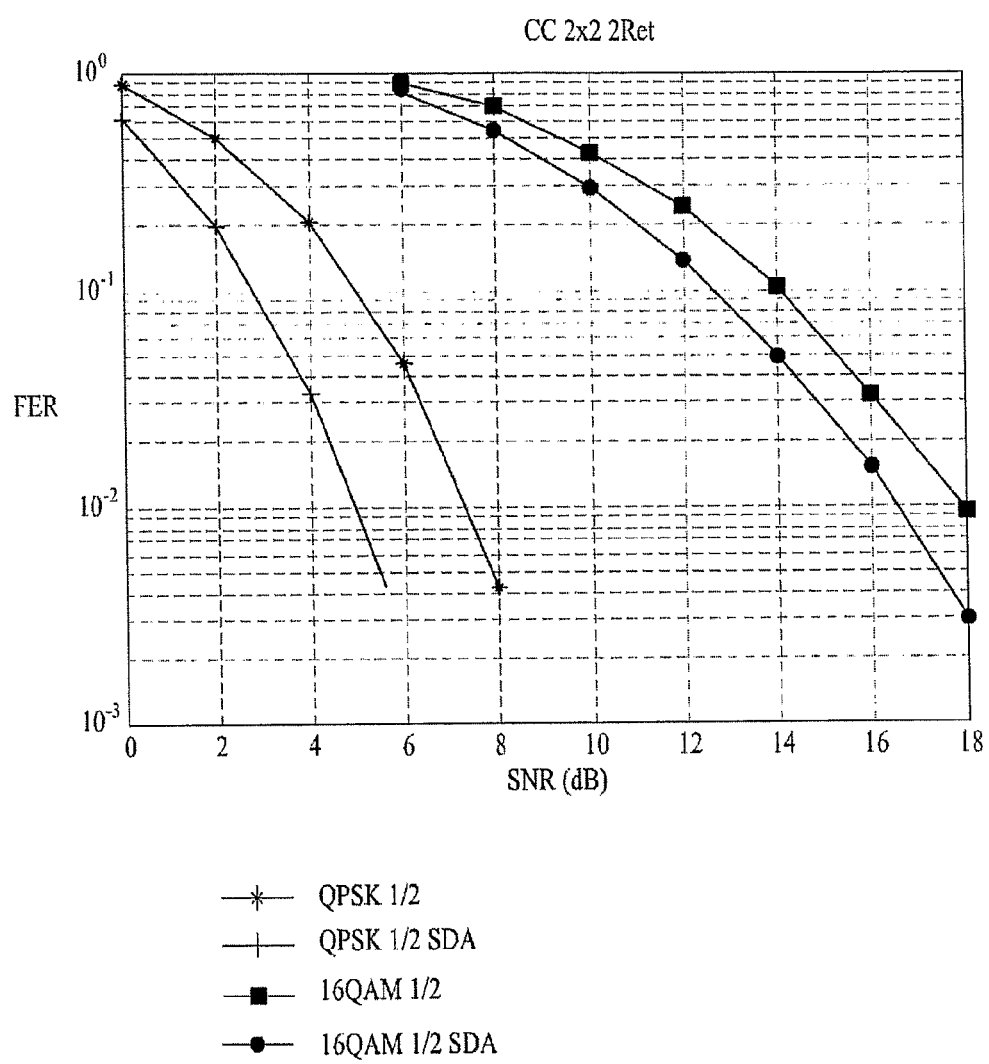
FIG. 12 is a graph illustrating FER to SNR performance in a detailed example according to an embodiment of the invention where two transmissions including one retransmission were performed in a communication system using two transmit antennas.

FIG. 12 illustrates FER to SNR performance in a detailed example according to an embodiment of the invention where two transmissions including one retransmission were performed in a communication system using two transmit antennas.

Specifically, FIG. 12 shows a comparison of FER to SNR performance at an MCS level of a coding rate of QPSK 1/2 and at an MCS level of a coding rate of 16QAM 1/2 between the case where real and ideal components of a complex transmission signal are mapped to different antennas while each component is mapped to a different antenna each time it is transmitted according to the embodiment of the invention as shown in FIG. 7 and the case where a general transmission method is applied as shown in FIG. 3 under the assumption that two transmit antennas are used and two transmissions are performed.

From the comparison of EFR to SNR performance shown in FIG. 12, it can be seen that, in the case of QPSK with a coding rate of 1/2, an SNR gain of about 2.2 dB is obtained at an FER of 10% and an SNR gain of about 2.3 dB is obtained at an FER of 1%, according to the above embodiment of the invention, when compared to the general transmission method as shown in FIG. 3. It can also be seen that, in the case of 16QAM with a coding rate of 1/2, an SNR gain of about 1.7 dB is obtained at an FER of 10% and an SNR gain of about 1.8 dB is obtained at an FER of 1% according to the above embodiment of the invention, when compared to the general transmission method as shown in FIG. 3.

Figure 13:
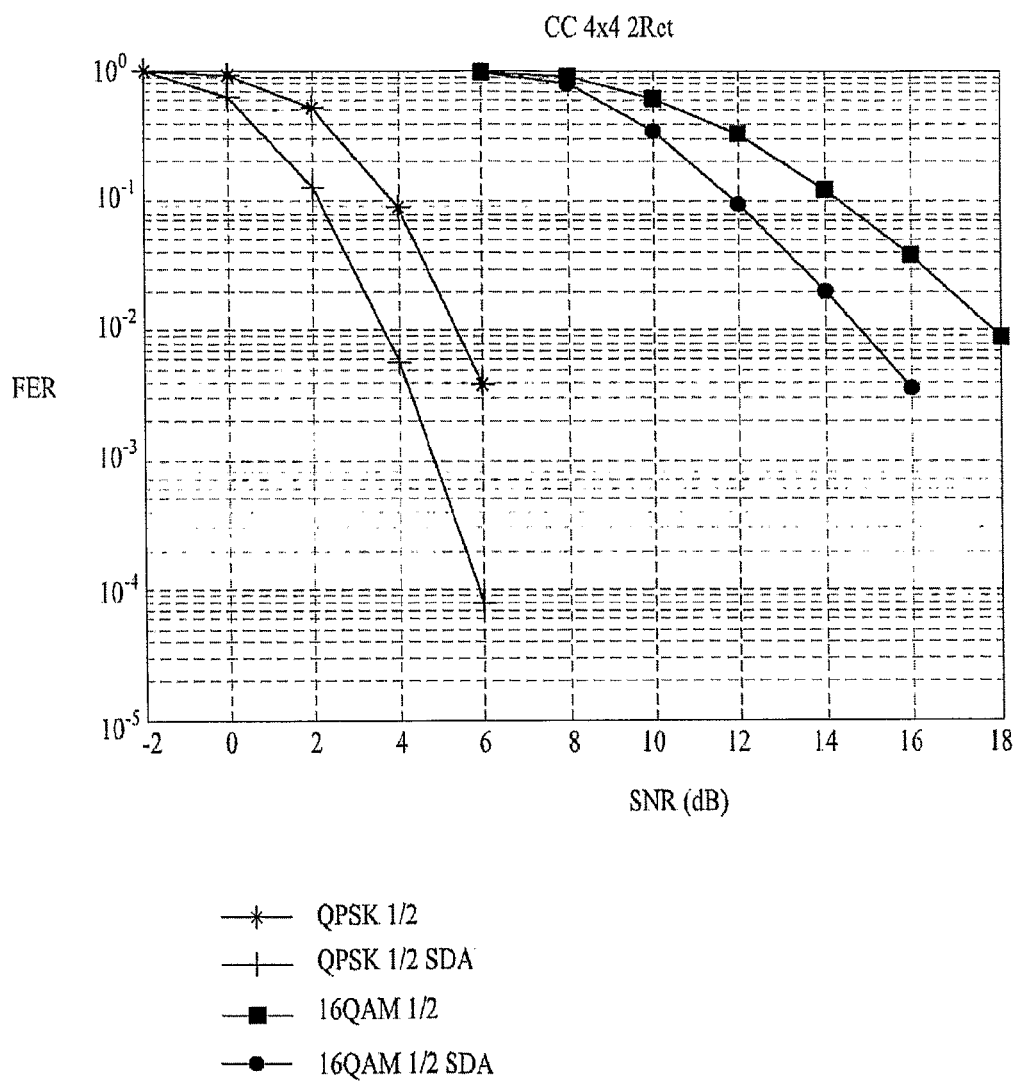
FIG. 13 is a graph illustrating FER to SNR performance in a detailed example according to an embodiment of the invention where two transmissions including one retransmission were performed in a communication system using four transmit antennas.

FIG. 13 illustrates FER to SNR performance in a detailed example according to an embodiment of the invention where two transmissions including one retransmission were performed in a communication system using four transmit antennas.

Specifically, FIG. 13 shows a comparison of FER to SNR performance at an MCS level of a coding rate of QPSK 1/2 and at an MCS level of a coding rate of 16QAM 1/2 between the case where real and ideal components of a complex transmission signal are mapped to different antennas while each component is mapped to a different antenna each time it is transmitted according to the embodiment of the invention as shown in FIG. 6 and the case where a general transmission method is applied as shown in FIG. 3 under the assumption that two transmit antennas are used and two transmissions are performed.

From the comparison of EFR to SNR performance shown in FIG. 13, it can be seen that, in the case of QPSK with a coding rate of 1/2, an SNR gain of about 1.9 dB is obtained at an FER of 10% and an SNR gain of about 2.0 dB is obtained at an FER of 1% according to the above embodiment of the invention, when compared to the general transmission method as shown in FIG. 3. It can also be seen that, in the case of 16QAM with a coding rate of 1/2, an SNR gain of about 2.2 dB is obtained at an FER of 10% and an SNR gain of about 3.2 dB is obtained at an FER of 1% according to the above embodiment of the invention, when compared to the general transmission method as shown in FIG. 3.

Figure 14:
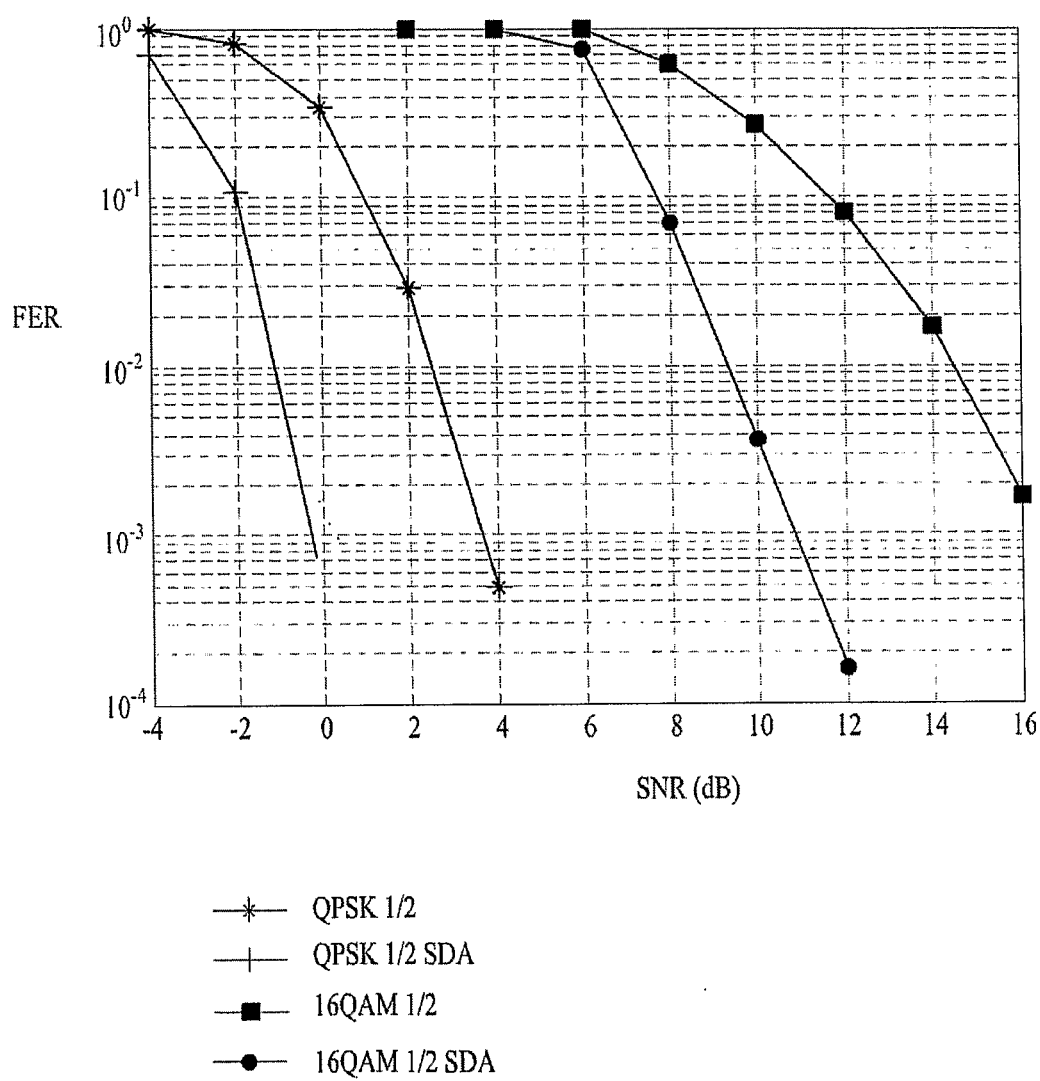
FIG. 14 is a graph illustrating FER to SNR performance in a detailed example according to an embodiment of the invention where four transmissions including three retransmissions were performed in a communication system using four transmit antennas.

FIG. 14 illustrates FER to SNR performance in a detailed example according to an embodiment of the invention where four transmissions including three retransmissions were performed in a communication system using four transmit antennas.

Specifically, FIG. 14 shows a comparison of FER to SNR performance at an MCS level of a coding rate of QPSK 1/2 and at an MCS level of a coding rate of 16QAM 1/2 between the case where real and ideal components of a complex transmission signal are mapped to different antennas while each component is mapped to a different antenna each time it is transmitted according to the embodiment of the invention as shown in FIG. 6 and the case where a general transmission method is applied as shown in FIG. 3 under the assumption that two transmit antennas are used and two transmissions are performed. Under this environment, the embodiment of the invention described above with reference to FIG. 6 can obtain the optimal channel diversity effects.

From the comparison of EFR to SNR performance shown in FIG. 14, it can be seen that, in the case of QPSK with a coding rate of 1/2, an SNR gain of about 3.0 dB is obtained at an FER of 10% and an SNR gain of about 3.8 dB is obtained at an FER of 1% according to the above embodiment of the invention, when compared to the general transmission method as shown in FIG. 3. It can also be seen that, in the case of 16QAM with a coding rate of 1/2, an SNR gain of about 4.0 dB is obtained at an FER of 10% and an SNR gain of about 5.0 dB is obtained at an FER of 1% according to the above embodiment of the invention, when compared to the general transmission method as shown in FIG. 3.

Each of the methods of the above embodiments of the invention described above is a simple method which does not need to take into consideration an additional overhead since the real and ideal components of transmission signals are mixed and mapped to different antennas each time they are transmitted. According to the embodiments of the invention, it is possible to obtain a sufficient gain since antenna indices are mixed to transmit a transmission signal even when fixed subcarrier indices are used in the OFDM system. The embodiments provide a method which can be applied regardless of the states of channels or situations of mobile users. That is, feedback information is unnecessary. The transmitting and receiving ends have predetermined allocation patterns. Using the predetermined allocation patterns, it is possible to eliminate the need to generate an additional signaling overhead to be sent from the transmitting end to the receiving end.

The methods according to the embodiments of the invention can be applied to any system, regardless of whether the system uses a single subcarrier or multiple subcarriers. Specifically, the system using a single subcarrier can change only the antenna index each time a transmission signal is transmitted. The system using multiple subcarriers can change both the antenna index and the subcarrier index for allocation each time a transmission signal is transmitted. Reference will now be made to a method in which transmission signals are mapped to multiple subcarrier regions rather than multiple transmit antennas in a system such as an OFDM system which uses multiple subcarriers as described above, i.e., a modified example of the embodiment described above with reference to FIG. 4 where the independent transmission paths are multiple subcarrier regions rather than multiple antennas.

Figure 15:
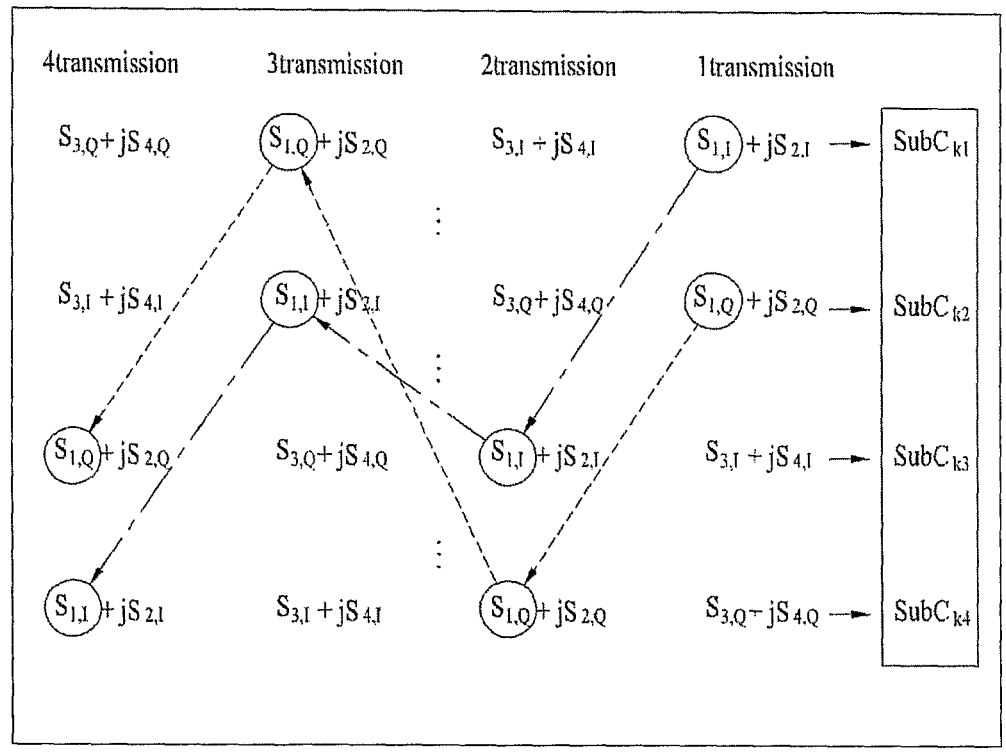
FIGS. 15 and 16 illustrate a method for transmitting transmission signals by mapping them to multiple subcarrier regions according to another embodiment of the invention.
Figure 16:
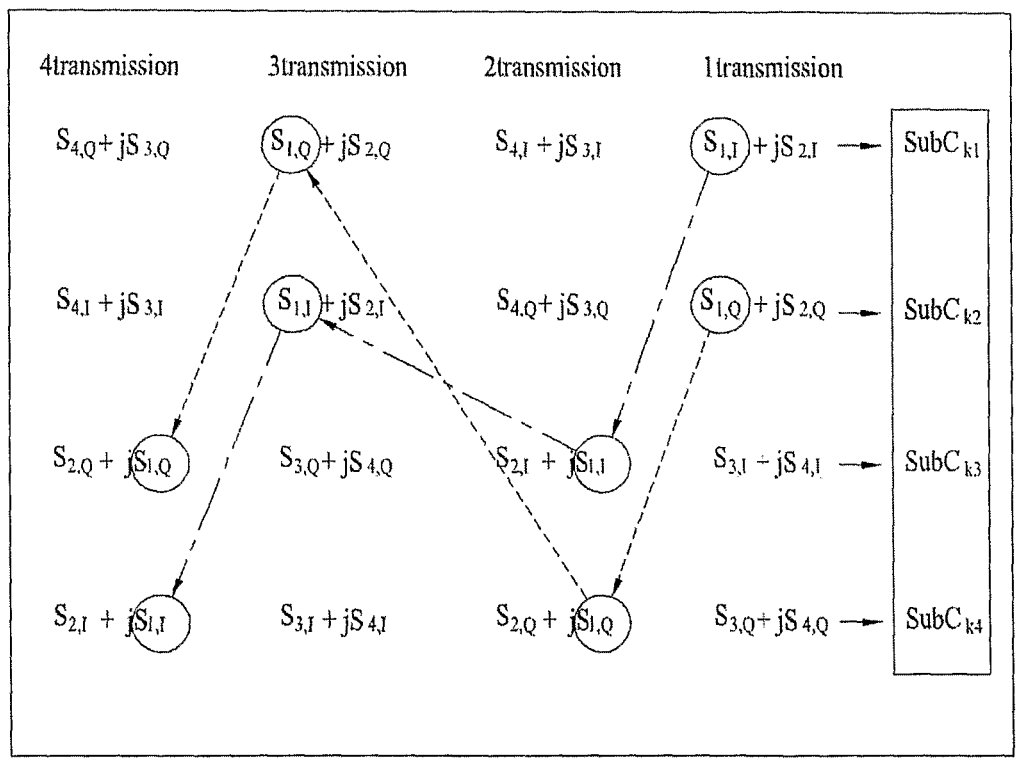

FIGS. 15 and 16 illustrate a method for transmitting transmission signals by mapping them to multiple subcarrier regions according to another embodiment of the invention.

In the embodiment shown in FIG. 15, multiple subcarrier regions such as $SubC_{k1}$ to $SubC_{k4}$ are independent transmission paths to which transmission signals are mapped as shown in FIG. 15. Here, in order to obtain channel diversity gain using this method, it is preferable that at least a minimum coherent bandwidth be present between each subcarrier region.

In the method shown FIG. 15, if a subcarrier region is used to transmit a transmission signal once, the subcarrier region is not used to transmit the transmission signal at next transmission as in the embodiment using multiple transmit antennas described above with reference to FIG. 6. In order to obtain channel diversity gain using this method, it is preferable that at least a minimum coherent bandwidth be maintained between each subcarrier region as described above. However, when the number of retransmissions is small, the subcarrier regions can be set such that the transmission signal is spread as widely as possible over the available frequency band when the transmission signal is transmitted. This can eliminate an overhead for signaling channel selectivity information to provide coherent bandwidth length information. In the case where no channel selectivity information is signaled, the transmitting and receiving ends have predetermined allocation patterns (specifically, share information of the interval between predetermined $SubC_k$ indices). Using the predetermined allocation patterns, it is possible to eliminate the need to generate an additional signaling overhead to be sent from the transmitting end to the receiving end. In the above embodiment that uses multiple subcarriers as independent transmission paths, the components of each transmission signal can be alternately mapped to real and ideal axes of each subcarrier region as shown in FIG. 16.

The above embodiment of the invention as shown in FIGS. 15 and 16, which is applied to a system such as an OFDM system which uses multiple subcarriers for signal transmission, can be implemented in combination with the above embodiment of the invention, which is applied to a system which uses multiple antennas as shown in FIGS. 6 and 8. In this case, the multiple independent transmission paths to which transmission signals are mapped may include multiple antennas and multiple subcarrier regions that are kept independent of each other at each antenna.

The above embodiments of the invention can not only be applied to the case where a transmitting end retransmits a signal to a receiving end since no ACK signal has been received from the receiving end in response to a signal transmitted to the receiving end but can also be similarly applied to a system that repeatedly transmits each codeword or symbol. For example, in the case where the transmitting end repeatedly broadcasts a transmission signal within a corresponding zone a predetermined number of times instead of transmitting a subsequent signal after receiving an ACK signal from the receiving end in response to a signal transmitted to the receiving end as in a zone-based broadcast and multicast services (BCMCS) system, it is possible to obtain diversity gain by repeatedly transmitting a transmission signal through a different independent transmission path each time the signal is transmitted or by transmitting real and ideal components of a complex transmission signal through different transmission paths each time the signal is transmitted.

The above embodiments of the invention can be applied not only to a system using 2 or 4 transmit antennas as described above in the example using multiple antennas but also to a system using any other number of transmit antennas. When the number of transmit antennas used in a communication system is increased, it is possible to increase the number of times a transmission signal can be retransmitted through a different antenna mapped to it from that mapped at first transmission, thereby obtaining a higher diversity gain.

The above embodiments can be applied regardless of the number of times a transmission signal is retransmitted. In the preferred embodiments of the invention, it is possible to obtain a higher diversity gain when the total number of transmissions including the first transmission is equal to or twice or more the number of independent transmission paths. However, it is also possible to achieve an improvement in the performance even when the number of transmissions is small.

Figure 1:
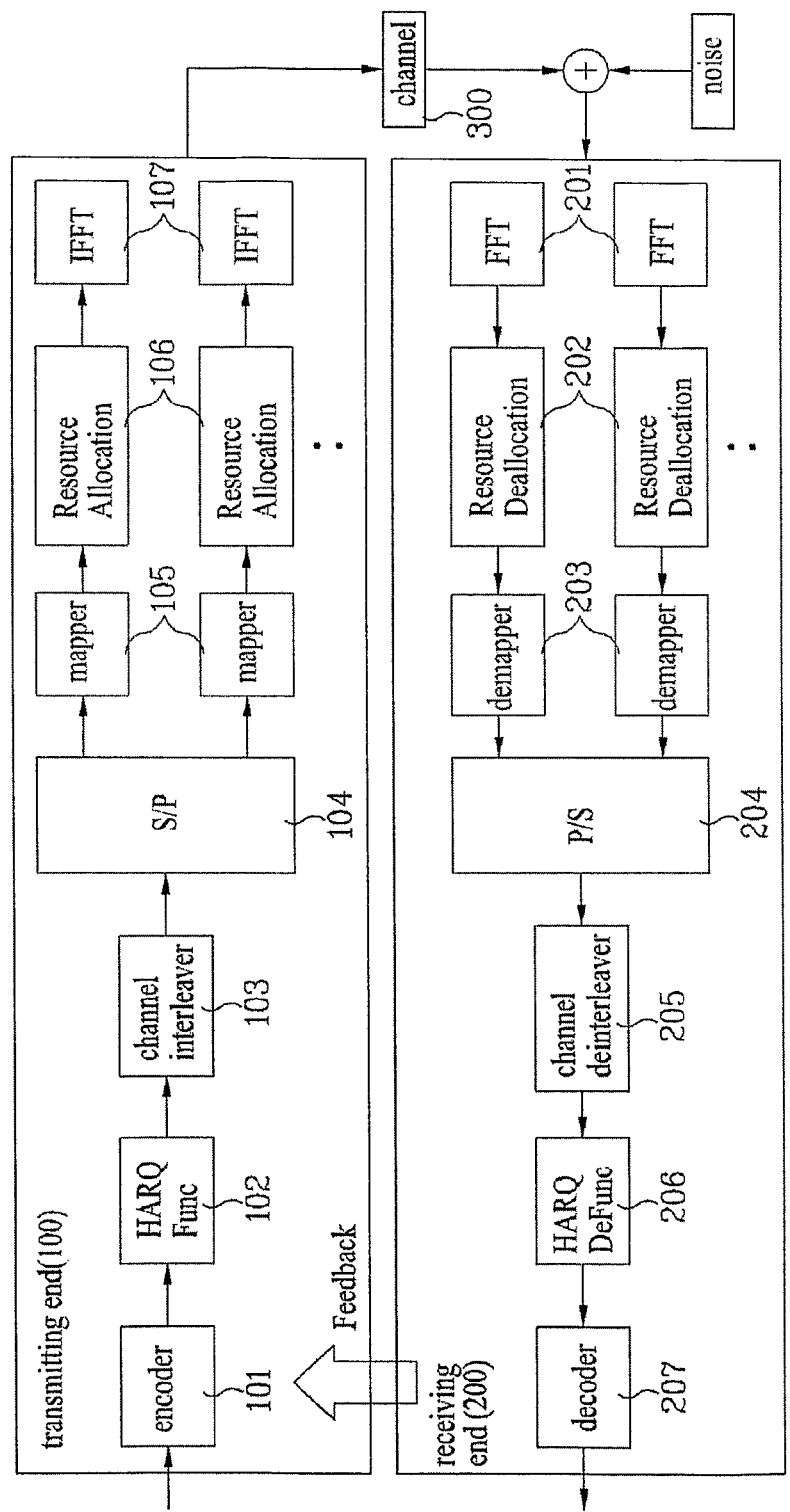
FIG. 1 illustrates the structures of transmitting and receiving ends using a single codeword (SCW) in a general multiple antenna OFDM communication system.
Figure 2:
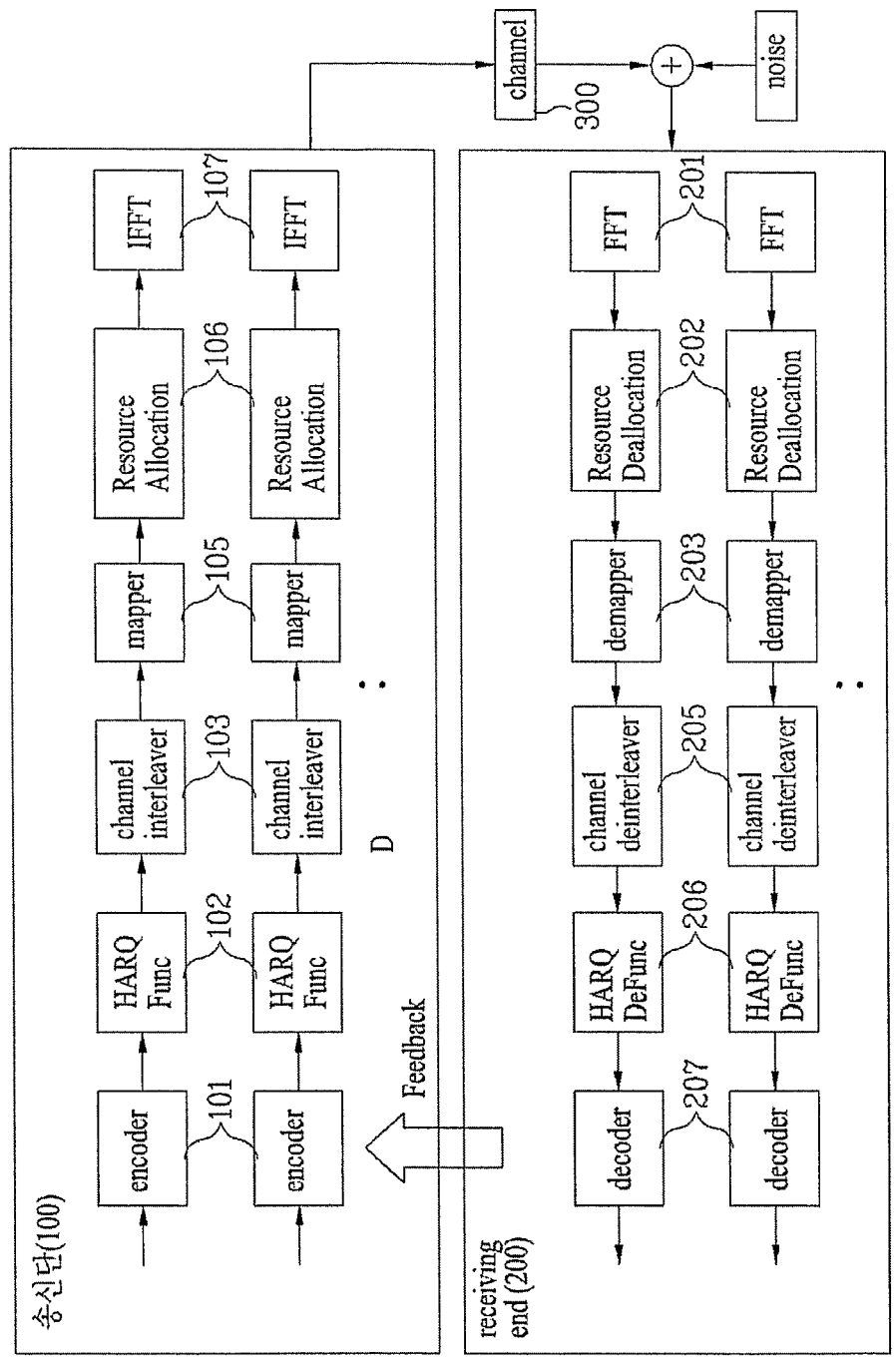
FIG. 2 illustrates the structures of transmitting and receiving ends using multiple codewords (MCW) in a general multiple antenna OFDM communication system.

In addition, the methods according to the embodiments of the invention can be applied to both the single codeword (SCW) structure as shown in FIG. 1 and the multiple codeword (MCW) structure as shown in FIG. 2. Even when mapping having a different modulation size is used for each codeword in the case where the method is applied to the MCW structure, it is possible to use the same mapping method without decreasing performance according to the above embodiment where real and ideal components of symbols rather than bits are used in a distributed manner.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

As is apparent from the above description, the embodiments of the invention provide a method for transmitting signals in a communication system which uses multiple independent paths such as multiple transmit antennas or multiple subcarrier regions, wherein independent transmission paths to which transmission signals are mapped are set to be different each time they are transmitted, thereby obtaining diversity gain. In addition, when transmission signals are complex signals, real and ideal components of the complex signals are separated and mapped to different transmission paths, thereby further improving the system performance.

The invention claimed is:

1. A method for transmitting signals in a communication system having multiple independent transmission paths, the method comprising:
    a first transmission process including transmitting multiple transmission signals by mapping the multiple transmission signals to the multiple independent transmission paths according to a specific mapping rule; and
    a second transmission process including retransmitting the multiple transmission signals by mapping each of the multiple transmission signals to a different independent transmission path from an independent transmission path that was mapped to the transmission signal in the first transmission process, wherein the transmission signals are complex signals, and real and ideal components of the complex signals are transmitted by mapping each of the real and ideal components to different independent transmission paths in the first and second transmission processes, wherein a real component of a first complex signal among the complex signals in the first transmission process is mapped to an ideal axis of a first independent transmission path in the second transmission process, and wherein an ideal component of a second complex signal among the complex signals in the first transmission process is mapped to a real axis of a second independent transmission path in the second transmission process.

2. The method according to claim 1, further comprising at least one additional transmission process including transmitting the multiple transmission signals by mapping the multiple transmission signals to the multiple independent transmission paths, wherein, when a total number of the transmission processes including the at least one additional transmission process is less than or equal to a number of the multiple independent transmission paths, the multiple transmission signals are transmitted by mapping each of the multiple transmission signals to a different independent transmission path in each of the transmission processes.

3. The method according to claim 1, wherein the communication system is a multiple antenna Orthogonal Frequency Division Multiplexing (OFDM) communication system, and the multiple independent transmission paths include at least one of multiple transmission paths formed by multiple antennas and multiple subcarrier regions.

4. The method according to claim 2, wherein the communication system is a multiple antenna Orthogonal Frequency Division Multiplexing (OFDM) communication system, and the multiple independent transmission paths include at least one of multiple transmission paths formed by multiple antennas and multiple subcarrier regions.

5. The method according to claim 3, wherein the multiple subcarrier regions are subcarrier regions having at least a minimum coherent bandwidth between the subcarrier regions.

6. The method according to claim 1, wherein the communication system is a multiple antenna Single Carrier-Frequency Division Multiplexing (SC-FDM) communication system, and the multiple independent transmission paths include at least one of transmission paths formed by multiple antennas.

* * * * *